Patented Feb. 29, 1944

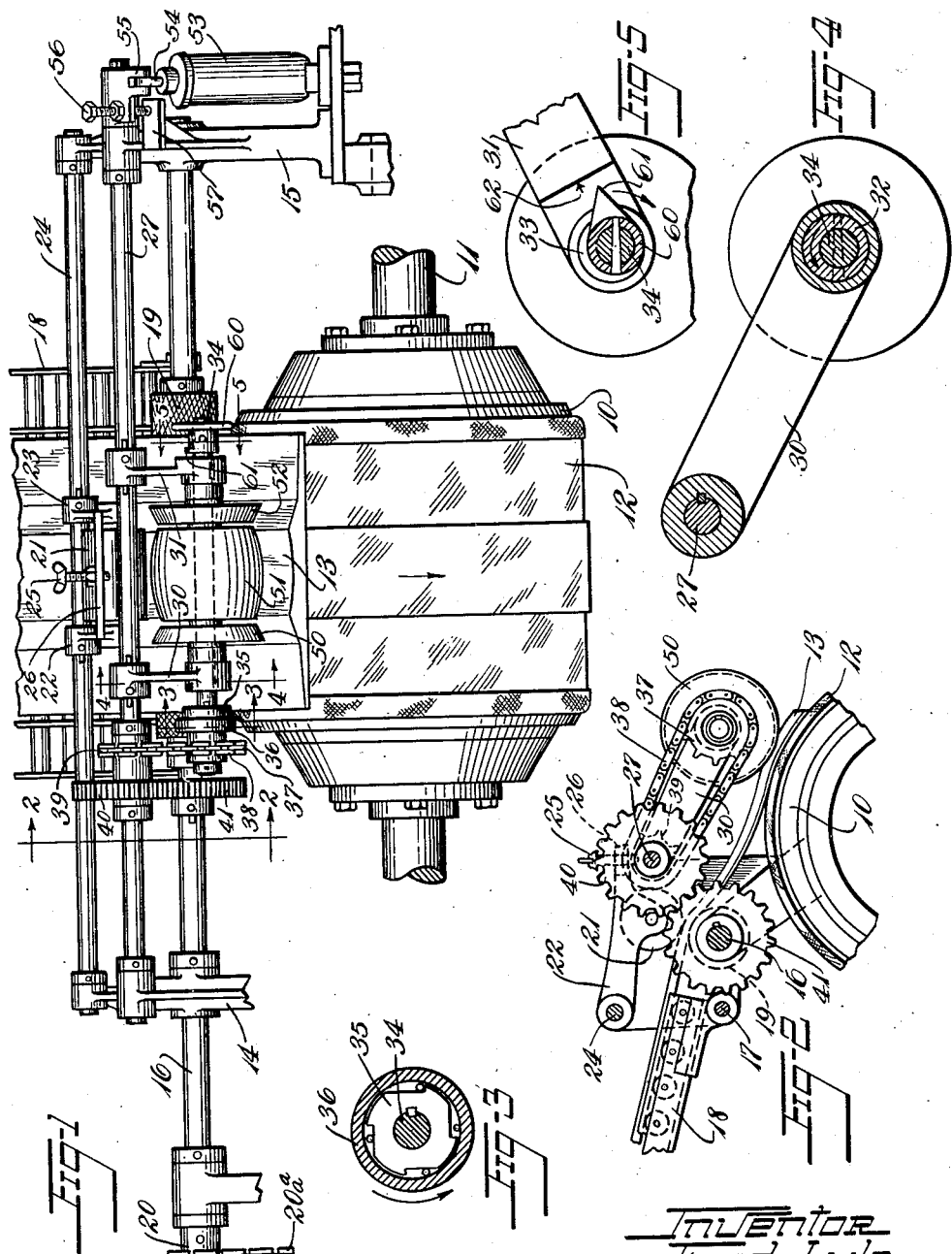

2,342,951

UNITED STATES PATENT OFFICE 2,342,951

APPARATUS FOR APPLYING TIRE TREADS

Fred Lyle, Jeffersonville, Pa., assignor to The B. F. Goodrich Company, New York, N. Y., a corporation of New York Application December 31, 1940, Serial No. 372,564

5 Claims. (Cl. 154—9)

This invention relates to applying treads of rubber or other rubber-like material to tires and is particularly useful in the manufacture of pneumatic tires on building drums.

In the manufacture of pneumatic tires, for the underlying body of the casing, bands of cord fabric or other sheet material together with bead cores have been assembled about a former or drum. The unvulcanized material for forming the overlying tread and side walls of the tire have been extruded or calendered to the desired cross-section and have usually been cut to length and fed to the drum while the drum was rotated through a single revolution, after which the ends of the tread have been spliced together. Due to the fact that the slab of tread material has shrunk somewhat after being cut to length, resulting in a thickening of the slab near its ends, and the splicing of these ends to each other has involved some overlapping of such ends, the tire resulting from such operations often has been undesirably unbalanced, being heavy at the side containing the splice. As the tread slab has been stretched longitudinally between the point of first attachment and the point of supply in feeding it to the drum, usually manually, it has naturally stretched most at its thinnest portion and least at its thickest portion so that stretching of the tread has aggravated the difficulty. Furthermore, where a slab of tread is pulled from a supply conveyor by dragging it therefrom the tread is stretched progressively from one end to the other, the stretch being greater at the start than at the finish.

The present invention aims to apply the tread slab more evenly, providing a better balanced article.

The principal objects of the invention are to provide for applying the tread material evenly as to thickness so as to be in proper balance, to provide for applying the ends of a tread slab under greater pressure than that applied to other portions thereof, to promote uniformity of product, and to provide simplicity of apparatus and convenience of procedure.

These and other objects will appear from the following description and the accompanying drawing.

Of the drawing, Fig. 1 is a front elevation of a tire building drum and tread applying apparatus constructed in accordance with and embodying the invention, the apparatus being shown in the position of applying the leading end of a tread slab, parts being broken away.

Fig. 2 is a sectional elevation thereof taken along line 2—2 of Fig. 1, parts being broken away.

Fig. 3 is a sectional detail view of the clutch taken along line 3—3 of Fig. 1.

Fig. 4 is a sectional detail view taken along line 4—4 of Fig. 1.

Fig. 5 is a sectional detail view taken along line 5—5 of Fig. 1.

In practicing the invention, the tread slab of unvulcanized rubber-like material is fed to a tire building drum having the underlying carcass portion of the tire supported thereon and is rolled progressively into adhesive contact with the carcass portion. During the rolling of the tread into place the leading and trailing thickened ends of the slab are squeezed against the carcass under greater pressure than that applied to other portions of the slab to compensate for their thickness and to provide a balanced structure. The apparatus may be set to apply properly modulated pressure, throughout the tread-applying operation.

Referring to the drawing, the numeral 10 designates a tire building drum which is supported for power rotation on a shaft 11. A previously prepared tire carcass 12 is supported by the drum and a covering slab 13 of rubber-like material for the tread and side walls of the tire is being applied thereto. The shaft 11 is rotatably supported from suitable frame members (not shown) which also support brackets 14, 15 in which a shaft 16 is rotatably journaled on an axis parallel to that of shaft 11. A rod 17 is mounted between the brackets parallel to shaft 16 and supports the delivery end of an inclined conveyor 18 over which the slab 13 is fed. A roll 19 having a knurled or other friction face is fixed to shaft 16 and has a face of sufficient length to span the slab.

Shaft 16 also has a sprocket 20 fixed thereto adapted to be driven from shaft 11 by a chain 20a, the arrangement being such that the roll 19 is driven at substantially the same surface speed as the surface of the tire carcass and draws the slab from the supply conveyor 18 at uniform speed by frictional contact therewith. A top roll 21 is freely journaled in a pair of brackets 22, 23 fixed to a shaft 24 rotatably mounted in bearings formed in brackets 14, 15. A stop-screw 25 adjustably fixed to a cross bar 26 connecting the brackets 22, 23 is adapted to impinge against a shaft 27 also rotatably mounted between brackets 14, 15. The arrangement is such that the top roll normally rests on the slab and holds it into frictional contact with roll 19 and when no slab is in place the top roll is supported by the stop screw.

Shaft 27 has a pair of arms 30, 31 fixed thereto. Each arm has an opening therethrough at its outer end in which a pair of eccentric bushings 32, 33 are rotatably mounted. A shaft 34 is fixed to said bushings. One member 35 of a ratchet over-running clutch is fixed to the shaft 34 and the cooperating member 36 is rotatably mounted on the shaft, the clutch being preferably of the roller friction type. A sprocket 37 is fixed to clutch member 36 and is adapted to be driven by a chain 38 from a sprocket 39 fixed to shaft 27. Shaft 27 is driven from shaft 16 by gears 40, 41 fixed to the shafts respectively. The arrangement is such that shaft 34 and bushings 32, 33 thereon are driven one revolution for each revolution of the drum and may be advanced in one direction independently of the drive by reason of the clutch.

A series of rollers 50, 51, 52 shaped to conform to the tread contour are independently and rotatably mounted on shaft 34 in position to engage the tread and press it against the drum. Pressure sufficient to thin the tread by deformation is obtained from a pressure fluid cylinder 53, the piston rod 54 of which is pivotally secured to an arm 55 fixed to shaft 27, the cylinder being pivotally secured to bracket 15. A stop screw 56 adjustably mounted on arm 55 is adapted to engage a stop 57 on bracket 15 to limit deformation of the tread. The arrangement is such that the rollers 50, 51, 52 are free to roll upon the drum and are pressed toward the drum against the tread but due to the eccentricity of the bushings 32, 33 greater pressure is applied to the tread at one position of the drum than at a position diametrically opposite thereto.

A hand wheel 60 is fixed to shaft 34 and has a pointer 61 for indicating the position of the eccentricity as to the shaft of the eccentric bushings. A mark 62 is placed on the arm 31 adjacent thereto. This enables the operator to manually set the shaft at the marked position before each tread is applied.

In the operation of the apparatus with the drum stationary, the leading end of a tread slab is advanced to a position where it is about to enter the bight between rollers 50, 51, 52 and drum 10. Hand wheel 60 is manipulated to set the shaft 34 at a position nearest the drum. Fluid pressure is then applied to cylinder 53 to clamp the slab to the material on the drum, clamping movement being limited by stop 57. The drum is then rotated through approximately one and one-quarter revolutions to apply the tread and due to the eccentricity of the bushings 32, 33 the tread rollers are nearer the drum at the start and at the finish of laying the tread and apply greater pressure to the thickened ends of the slab thereby thinning them out and providing a more nearly uniform distribution of the material about the tire and a better balanced structure. Before applying the succeeding tread, the hand wheel 60 is turned back to the starting position indicated by the pointer 61, the over-running clutch permitting such resetting of the hand wheel.

Variations may be made without departing from the scope of the invention as it is defined by the following claims.

I claim:

1. Apparatus for applying a tread slab to a tire carcass, said apparatus comprising a rotatable drum for supporting said carcass, a roller for progressively rolling the slab in place upon the carcass, means for applying pressure to said roller, and means for varying the degree of pressure during the rolling operation, the pressure-varying means including means responsive to rotative movement of the drum for pressing the roller closer to the drum at a determinate rotative position of the drum than at other rotative positions thereof.

2. Apparatus for applying a tread slab to a tire carcass, said apparatus comprising a drum for supporting said carcass, a roller supported adjacent to the surface of the drum, and eccentric means for moving said roller toward and from the drum to vary pressure upon a tread slab applied therebetween.

3. Apparatus for applying a tread slab to a tire carcass, said apparatus comprising means for rotatably supporting a tire carcass, means for feeding a slab of tread material progressively thereto, rotatable pressing means supported adjacent said supporting means for engaging said slab and pressing it against the tire carcass, and means for moving said pressing means toward and from said supporting means to vary the pressure upon a tread slab applied therebetween, the moving means including means responsive to rotative movement of said supporting means for increasing the pressure of said pressing means at a determinate rotative position of said supporting means beyond the pressure at other rotative positions of said supporting means.

4. Apparatus for applying a tread slab to a tire carcass, said apparatus comprising means for rotatably supporting a tire carcass, means for feeding a slab of tread material progressively thereto, rotatable pressing means supported adjacent said supporting means, means comprising an over-running clutch for driving said pressing means from said supporting means, and means for moving said pressing means toward and from said supporting means to vary the pressure upon a tread slab applied therebetween.

5. Apparatus for applying a tread slab to a tire carcass, said apparatus comprising means for supporting a tire carcass, and means including a roller for progressively applying the slab thereto, said supporting means and said applying means being relatively movable, and means responsive to relative movement of said supporting means and said applying means for moving said roller closer to said supporting means at determinate relative positions thereof than at other relative positions thereof.

FRED LYLE.